United States Patent
Miyahara

(10) Patent No.: US 11,195,305 B2
(45) Date of Patent: Dec. 7, 2021

(54) METHOD AND DEVICE FOR IDENTIFYING STEREOSCOPIC OBJECT, AND VEHICLE AND STORAGE MEDIUM

(71) Applicant: Great Wall Motor Company Limited, Baoding (CN)

(72) Inventor: Shunji Miyahara, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 0 days.

(21) Appl. No.: 16/762,404

(22) PCT Filed: Nov. 7, 2018

(86) PCT No.: PCT/CN2018/114241
§ 371 (c)(1),
(2) Date: May 7, 2020

(87) PCT Pub. No.: WO2019/091381
PCT Pub. Date: May 16, 2019

(65) Prior Publication Data
US 2020/0349740 A1 Nov. 5, 2020

(30) Foreign Application Priority Data
Nov. 7, 2017 (CN) .......................... 201711086600.4

(51) Int. Cl.
*G06T 7/00* (2017.01)
*G06T 7/579* (2017.01)
*G06K 9/00* (2006.01)
(52) U.S. Cl.
CPC ............ *G06T 7/97* (2017.01); *G06K 9/00208* (2013.01); *G06K 9/00805* (2013.01); *G06T 7/579* (2017.01)

(58) Field of Classification Search
None
See application file for complete search history.

(56) References Cited

U.S. PATENT DOCUMENTS 10,466,718 B2 * 11/2019 Tang .................... G01C 3/00
10,839,539 B2 * 11/2020 Kowdle ............... H04N 13/271
(Continued)

FOREIGN PATENT DOCUMENTS

CN 101398886 A 4/2009
CN 101714262 A 5/2010
(Continued)

*Primary Examiner* — Delomia L Gilliard
(74) *Attorney, Agent, or Firm* — Volpe Koenig

(57) ABSTRACT

A method and device for identifying a stereoscopic object, and a vehicle and a storage medium are described. They are used for solving the problem that a monocular camera cannot determine whether an object to be identified is a stereoscopic object. The method is applied to a vehicle, and the method comprises: during driving, photographing an object to be identified by means of a monocular camera on the vehicle, so as to obtain a plurality of images (S11); determining, according to the plurality of images, an imaging change rule of the object to be identified that is projected onto an imaging plane of the monocular camera, wherein the imaging changes along with a change in the distance between the object to be identified and the vehicle (S12); and if the imaging change rule matches a quadratic curve, determining that the object to be identified is a stereoscopic object (S13).

13 Claims, 4 Drawing Sheets

(56) References Cited

U.S. PATENT DOCUMENTS

2008/0106462 A1    5/2008  Shiraishi
2015/0243107 A1*   8/2015  Schowengerdt ..... G02B 5/1814
                                                    345/633

FOREIGN PATENT DOCUMENTS

| CN | 102416954 | A | 4/2012 |
| CN | 102653272 | A | 9/2012 |
| CN | 103247048 | A | 8/2013 |
| CN | 103278110 | A | 9/2013 |
| CN | 103299617 | A | 9/2013 |
| CN | 103455791 | A | 12/2013 |
| CN | 103559703 | A | 2/2014 |
| CN | 104115186 | A | 10/2014 |
| EP | 297 5553 | A1 | 1/2016 |

* cited by examiner

METHOD AND DEVICE FOR IDENTIFYING STEREOSCOPIC OBJECT, AND VEHICLE AND STORAGE MEDIUM

CROSS REFERENCE TO RELATED APPLICATIONS

This application is a 35 USC § 371 national stage of PCT/CN2018/114241, which was filed on Nov. 7, 2018, claims priority to Chinese Application No. 201711086600.4, filed on Nov. 7, 2017, and is entitled "METHOD AND DEVICE FOR IDENTIFYING STEREOSCOPIC OBJECT, AND VEHICLE AND STORAGE MEDIUM," both of which are incorporated herein by reference as if fully set forth.

FIELD OF THE INVENTION

The present disclosure relates to the technical field of intelligent driving, and more particularly relates to a method and device for identifying a stereoscopic object, a vehicle and a storage medium.

BACKGROUND OF THE INVENTION

Advanced Driver Assistant Systems (ADAS) can sense surrounding environments by means of various types of sensors mounted on the vehicle, collect data, and identify and track objects in different motion states at any time in a running process of an vehicle, and then operation and analysis of the system are performed according to map data of a navigator, so as to enable a driver to be aware of possible danger in advance to effectively improve the comfortableness and safety of driving.

The related art provides a lane shift system. The system includes a monocular camera used for collecting images around a vehicle, and extracts feature information related to features of a lane line from the images around the vehicle according to a certain algorithm, thereby determining whether the vehicle is off the lane line during running. However, in some complicated scenes for imaging, it is impossible to distinguish whether an object to be identified on a lane in the image collected by the monocular camera is a road surface marker or a stereoscopic object. For example, when the color of a roadside railing is close to the color of the lane line, it is impossible to distinguish whether the object to be identified is the railing or the lane line through the image.

SUMMARY OF THE INVENTION

In view of this, the present disclosure aims to provide a method and device for identifying a stereoscopic object, a vehicle and a storage medium, so as to solve the problem that a monocular camera cannot determine whether an object to be identified is a stereoscopic object.

In order to achieve the above objective, the technical solution of the present disclosure is realized as follows.

A first aspect of the exemplary embodiment of the present disclosure provides a method for identifying a stereoscopic object. The method is applied to a vehicle, and the method comprises: photographing, during the driving process of a vehicle, an object to be identified by means of a monocular camera on the vehicle, so as to obtain a plurality of images; determining, according to the plurality of images, an imaging change rule of the object to be identified that is projected onto an imaging plane of the monocular camera, wherein the imaging changes along with a change in the distance between the object to be identified and the vehicle; and determining that the object to be identified is a stereoscopic object if the imaging change rule matches a quadratic curve.

Further, the number of the plurality of images is N, and N is an integer greater than 3. The step of determining, according to the plurality of images, an imaging change rule of the object to be identified that is projected onto the imaging plane of the monocular camera comprises:

setting i to be from 1 to N in sequence, and performing the following steps on the $i^{th}$ image among the plurality of images:

extracting the $i^{th}$ sub-image used for representing the object to be identified from the $i^{th}$ image;

determining the area Si of the object to be identified that is projected onto the imaging plane of the monocular camera according to the $i^{th}$ sub-image;

determining the distance Di between the object to be identified and the vehicle when the $i^{th}$ image is obtained by means of the monocular camera; and fitting a quadratic curve used for representing a change rule of the imaging area S along with the distance D between the object to be identified and the vehicle by using a quadratic regression type according to Si and Di corresponding to each of the plurality of images.

Further, the number of the plurality of images is N, and N is an integer greater than 3. The step of determining, according to the plurality of images, an imaging change rule of the object to be identified that is projected onto the imaging plane of the monocular camera comprises:

setting i to be from 1 to N in sequence, and performing the following steps on the $i^{th}$ image among the plurality of images:

extracting the $i^{th}$ sub-image used for representing the object to be identified from the $i^{th}$, image;

determining a solid angle $\Omega i$ corresponding to the object to be identified according to the $i^{th}$ sub-image;

determining the distance Di between the object to be identified and the vehicle when the $i^{th}$ image is obtained by means of the monocular camera: and fitting a quadratic curve used for representing a change rule of an imaging solid angle $\Omega$ along with the distance D between the object to be identified and the vehicle by using a quadratic regression type according to $\Omega i$ and Di corresponding to each of the plurality of images.

Further, the step of determining the distance Di between the object to be identified and the vehicle when the $i^{th}$ image is obtained by means of the monocular camera comprises:

initializing the distance between the object to be identified and the vehicle to be Dconstant before the first image is obtained by means of the monocular camera;

determining the driving distance Dix of the vehicle when the $i^{th}$ image is obtained by means of the monocular camera; and determining the distance Di between the object to be identified and the vehicle according to Dconstant and Dix.

Further, the step of determining that the object to be identified is a stereoscopic object if the imaging change rule matches the quadratic curve comprises:

determining a residual standard deviation of the fitted quadratic curve; and determining that the object to be identified is a stereoscopic object if the residual standard deviation is within a preset value range.

Further, the method further comprises: determining that the object to be identified is a road surface marker if the residual standard deviation is outside the preset value range.

A second aspect of the exemplary embodiment of the present disclosure provides a device for identifying a stereoscopic object. The device is applied to a vehicle, and the device comprises:

a collection module, used for photographing, during the driving process of a vehicle, an object to be identified by means of a monocular camera on the vehicle, so as to obtain a plurality of images;

a rule determination module, used for determining, according to the plurality of images, an imaging change rule of the object to be identified that is projected onto an imaging plane of the monocular camera, wherein the imaging changes along with a change in the distance between the object to be identified and the vehicle; and a result determination module, used for determining that the object to be identified is a stereoscopic object if the imaging change rule matches a quadratic curve.

Further, the number of the plurality of images is N, and N is an integer greater than 3. The rule determination module is used for setting i to be from 1 to N in sequence, and performing the following steps on the $i^{th}$ image among the plurality of images:

extracting the $i^{th}$ sub-image used for representing the object to be identified from the $i^{th}$ image;

determining the area Si of the object to be identified that is projected onto the imaging plane of the monocular camera according to the $i^{th}$ sub-image;

determining the distance Di between the object to be identified and the vehicle when the $i^{th}$ image is obtained by means of the monocular camera; and fitting a quadratic curve used for representing a change rule of the imaging area S along with the distance D between the object to be identified and the vehicle by using a quadratic regression type according to Si and Di corresponding to each of the plurality of images.

Further, the number of the plurality of images is N, and N is an integer greater than 3. The rule determination module is used for setting i to be from 1 to N in sequence, and performing the following steps on the $i^{th}$ image among the plurality of images:

setting i to be from 1 to N in sequence, and performing the following steps on the $i^{th}$ image among the plurality of images:

extracting the $i^{th}$ sub-image used for representing the object to be identified from the $i^{th}$ image;

determining a solid angle Ωi corresponding to the object to be identified according to the $i^{th}$ sub-image;

determining the distance Di between the object to be identified and the vehicle when the $i^{th}$ image is obtained by means of the monocular camera; and fitting a quadratic curve used for representing a change rule of an imaging solid angle Ω along with the distance D between the object to be identified and the vehicle by using a quadratic regression type according to Ωi and Di corresponding to each of the plurality of images.

Further, the rule determination module is used for: initializing the distance between the object to be identified and the vehicle to be Dconstant before the first image is obtained by means of the monocular camera;

determining the driving distance Dix of the vehicle when the $i^{th}$ image is obtained by means of the monocular camera; and determining the distance Di between the object to be identified and the vehicle according to Dconstant and Dix.

Further, the result determination module comprises;

a residual standard deviation determination sub-module, used for determining a residual standard deviation of the fitted quadratic curve; and an identification sub-module, used for determining that the object to be identified is a stereoscopic object when the residual standard deviation is within a preset value range.

Further, the identification sub-module is further used for: determining that the object to be identified is a road surface marker when the residual standard deviation is outside the preset value range.

A third aspect of the exemplary embodiment of the present disclosure provides a computer readable storage medium storing a computer program. The program, when executed by a processor, implements the steps of any one of the above methods for identifying the stereoscopic object.

A fourth aspect of the exemplary embodiment of the present disclosure provides a device for identifying a stereoscopic object, comprising: the computer readable storage medium; and one or more processors used for executing the program in the computer readable storage medium.

A fifth aspect of the exemplary embodiment of the present disclosure provides a vehicle. The vehicle comprises any optional embodiment of the second aspect or the device for identifying the stereoscopic object in the fourth aspect.

During the driving process of the vehicle, the object to be identified is photographed by the monocular camera on the vehicle, and the imaging change rule of the object to be identified that is projected onto the imaging plane of the monocular camera is determined according to the plurality of obtained images. If the imaging change rule matches the quadratic curve, it is determined that the object to be identified is a stereoscopic object. In this way, the problem that the monocular camera cannot determine whether the object to be identified is a stereoscopic object is solved, and the identification precision of the ADAS for the object to be identified on a lane is improved.

Other features and advantages of the present disclosure will be described in detail in the following specific embodiments.

BRIEF DESCRIPTION OF DRAWINGS

The accompanying drawings are used to provide a further understanding of the present disclosure, and constitute a part of the description. They are used to explain the present disclosure together with the following specific embodiments, but do not constitute a limitation to the present disclosure. In the drawings.

DETAILED DESCRIPTION OF THE EMBODIMENTS

Specific embodiments of the present disclosure will be described in detail below in conjunction with the accompanying drawings. It should be understood that the specific embodiments described herein are only used to illustrate and explain the present disclosure, and are not intended to limit the present disclosure.

Figure 1:
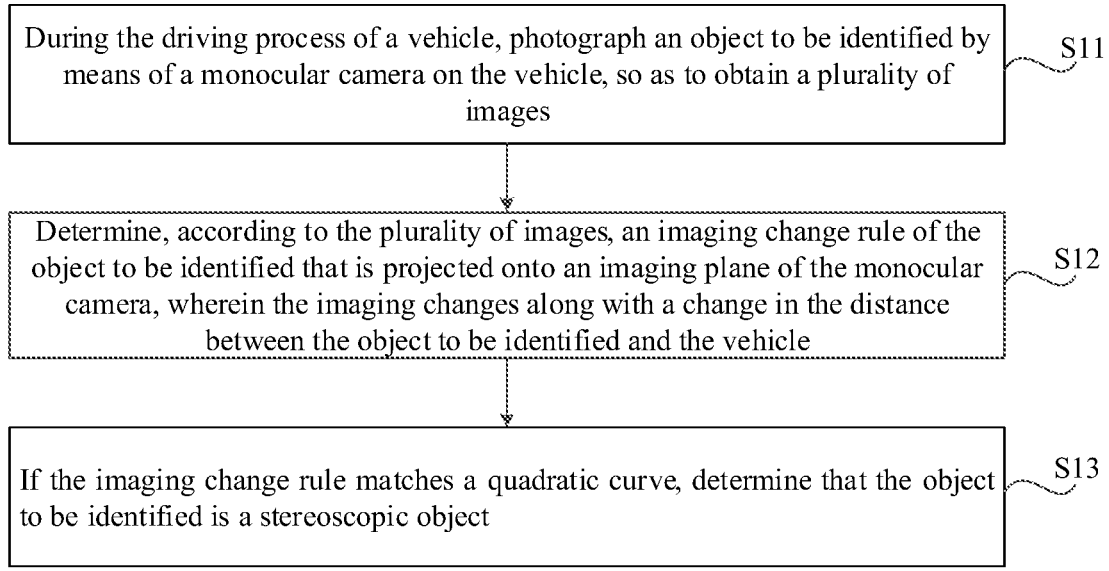
FIG. 1 shows a method for identifying a stereoscopic object illustrated by an exemplary embodiment of the present disclosure.
Figure 2:
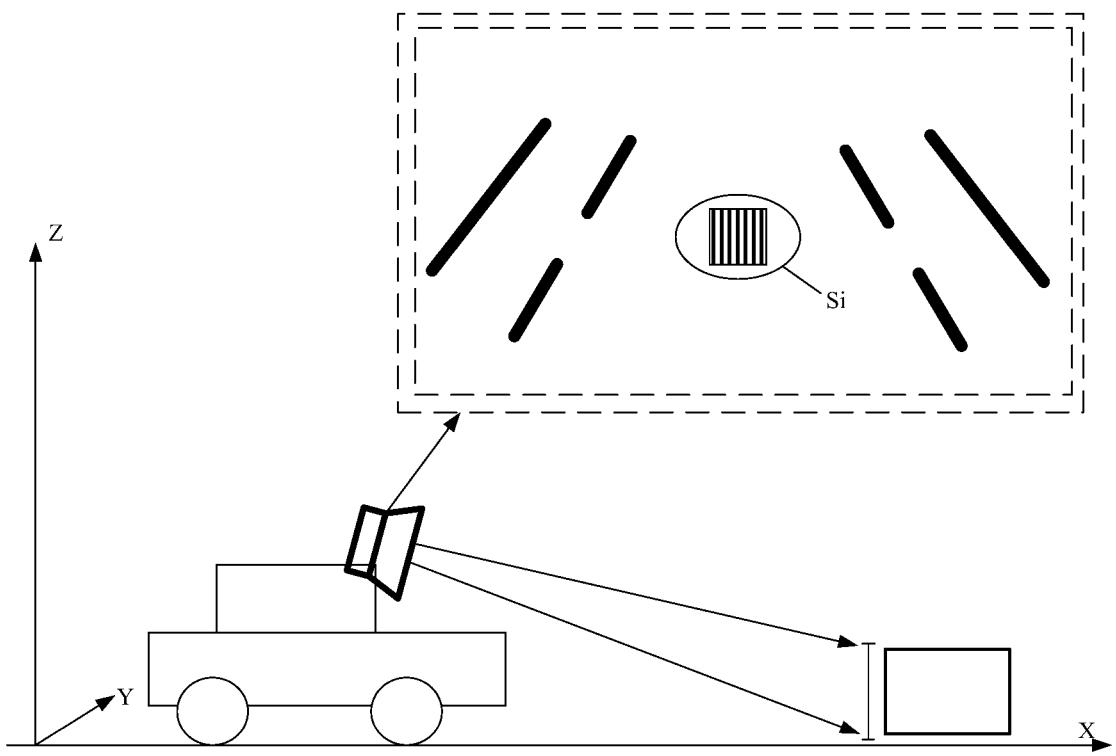
FIG. 2 is a schematic diagram of an implementation scenario illustrated by an exemplary embodiment of the present disclosure.

FIG. 1 shows a method for identifying a stereoscopic object illustrated by an exemplary embodiment of the present disclosure. The method may be applied to a vehicle as shown in FIG. 2. The method comprises the following steps.

S11, during the driving process of a vehicle, an object to be identified is photographed by a monocular camera on the vehicle, so as to obtain a plurality of images.

A reference is made to the schematic diagram of an implementation scenario as shown in FIG. 2. A three-coordinate system is built by taking an axial direction parallel to a road surface and pointing to the front of the vehicle as an X axis, an axial direction perpendicular to the road surface and pointing to the upside of the vehicle as a Z axis, and an axial direction parallel to the road surface and pointing to the right side of a driving position of the vehicle as a Y axis. During a forward running process of the vehicle toward the X axis, the object to be identified running on a road is photographed by the monocular camera on the vehicle. The collected images may refer to the scenario shown by a dotted box in FIG. 2. Dotted lines are lane lines, and solid lines are edge lines of the road. The strip-type image circled at the middle portion of the picture is an image of the object to be identified on the imaging plane of the monocular camera.

S12, an imaging change rule of the object to be identified that is projected onto an imaging plane of the monocular camera is determined according to the plurality of images, wherein the imaging changes along with a change in the distance between the object to be identified and the vehicle.

For example, if the vehicle moves forwards towards the object to be identified, the vehicle gets closer and closer to the object to be identified, and the image of the object to be identified on the imaging plane of the monocular camera becomes bigger and bigger. That is, the image of the object to be identified has a larger and larger proportion in the imaging picture. On the contrary, if the vehicle moves backwards away from the object to be identified, the image of the object to be identified on the imaging plane of the monocular camera becomes smaller and smaller.

S13, if the imaging change rule matches a quadratic curve, it is determined that the object to be identified is a stereoscopic object.

According to the method of identifying the stereoscopic object of the present disclosure, during the driving process of the vehicle, the object to be identified is photographed by the monocular camera on the vehicle, and the imaging change rule of the object to be identified that is projected onto the imaging plane of the monocular camera is determined according to the plurality of obtained images.

If the imaging change rule matches the quadratic curve, it is determined that the object to be identified is a stereoscopic object. In this way, the problem that the monocular camera cannot determine whether the object to be identified is a stereoscopic object is solved, and the identification precision of an ADAS for the object to be identified on a lane is improved.

In one optional embodiment, the step of determining, according to the plurality of images, an imaging change rule of the object to be identified that is projected onto the imaging plane of the monocular camera (the number is N that is an integer greater than 3) comprises:

setting i to be from 1 to N in sequence, and performing the following steps on the $i^{th}$ image among the plurality of images:

extracting the $i^{th}$ sub-image used for representing the object to be identified from the $i^{th}$ image;

determining the area Si of the object to be identified that is projected onto the imaging plane of the monocular camera according to the $i^{th}$ sub-image;

determining the distance Di between the object to be identified and the vehicle when the $i^{th}$ image is obtained by means of the monocular camera; and fitting a quadratic curve used for representing a change rule of the imaging area S along with the distance D between the object to be identified and the vehicle by using a quadratic regression type according to Si and Di corresponding to each of the plurality of images.

In another optional embodiment, the step of determining, according to the plurality of images, an imaging change rule of the object to be identified that is projected onto the imaging plane of the monocular camera (the number is N that is an integer greater than 3) comprises:

setting i to be from 1 to N in sequence, and performing the following steps on the $i^{th}$ image among the plurality of images:

extracting the $i^{th}$ sub-image used for representing the object to be identified from the $i^{th}$ image;

determining a solid angle $\Omega i$ corresponding to the object to be identified according to the $i^{th}$ sub-image;

determining the distance Di between the object to be identified and the vehicle when the $i^{th}$ image is obtained by means of the monocular camera; and fitting a quadratic curve used for representing a change rule of an imaging solid angle $\Omega$ along with the distance D between the object to be identified and the vehicle by using a quadratic regression type according to $\Omega i$ and Di corresponding to each of the plurality of images.

The step of determining that the object to be identified is a stereoscopic object if the imaging change rule matches the quadratic curve comprises: determining a residual standard deviation of the fitted quadratic curve; and determining that the object to be identified is a stereoscopic object if the residual standard deviation is within a preset value range; otherwise, determining that the object to be identified is a road surface marker, such as a lane line or a road shadow, if the residual standard deviation is outside the preset value range.

Optionally, the step of determining the distance Di between the object to be identified and the vehicle when the $i^{th}$ image is obtained by means of the monocular camera comprises:

initializing the distance between the object to be identified and the vehicle to be Dconstant before the first image is obtained by means of the monocular camera;

determining the driving distance Dix of the vehicle when the $i^{th}$ image is obtained by means of the monocular camera; and determining the distance Di between the object to be identified and the vehicle according to Dconstant and Dix.

The principle of the abovementioned technical solution is described below in conjunction with actual measurement scenarios, wherein a cubic object placed on the road and having the length, the width and the height all equal to 0.4 m and a road surface marker having a width of 0.6 m and a length of 5 m are taken as examples.

Figure 3:
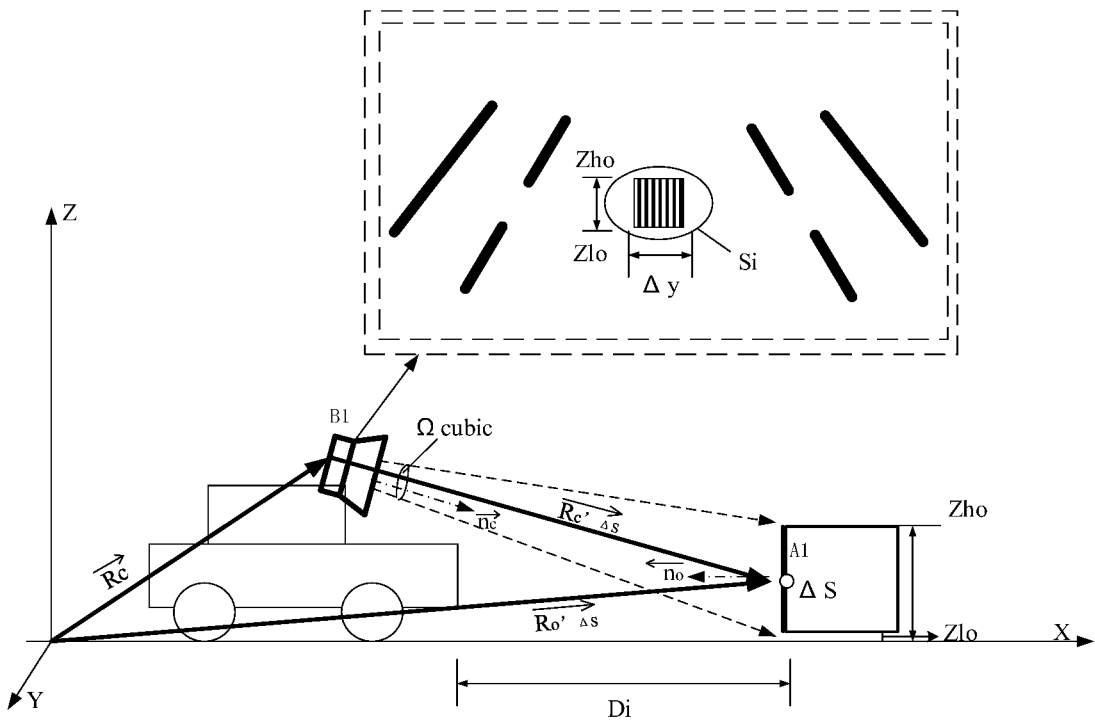
FIG. 3 is a schematic diagram of another implementation scenario illustrated by an exemplary embodiment of the present disclosure.

(1) FIG. 3 is a schematic diagram of a scenario illustrated by an exemplary embodiment of the present disclosure. If the object to be identified is a cubic object, an imaging solid angle $\Omega_{cubic}$ of a visual surface A1 of the cubic object relative to the imaging plane B1 of the monocular camera can be calculated through the following formula:

$$\overrightarrow{R_{c'\Delta s}} = \overrightarrow{R_{o'\Delta s}} - \overrightarrow{R_c} \quad (1)$$

$$\Omega_{cubic} = \Delta y \int_{zlo}^{zho} \frac{-\overrightarrow{n_c} \cdot \overrightarrow{n_o}}{|\overrightarrow{R_{c'-s}}|^2} dz \quad (2)$$

The $i^{th}$ image is taken for example. The $i^{th}$ sub-image used for representing the cubic object is extracted from the $i^{th}$ image. As shown in FIG. 3, the circled strip-type image is the sub-image, i.e., an image of the visual surface of the cubic object on the imaging plane of the monocular camera, which has the area of Si. A three-dimensional stereoscopic model of the object to be identified is built according to the $i^{th}$ sub-image, thus obtaining a width $\Delta y$, the height zlo of the lower edge and the height zho of the higher edge of the cubic object.

For the step of determining the distance Di between the object to be identified and the vehicle when the $i^{th}$ image is obtained by means of the monocular camera, in one optional embodiment, the absolute distance Di_absolute between the vehicle and the object to be identified can be obtained by building the three-dimensional stereoscopic model of a photographing scenario during the photographing of the object to be identified. Or, the absolute distance Di_absolute between the vehicle and the object to be identified can also be obtained through measurement by a ranging sensor on the vehicle, and the like.

In another optional embodiment, the relative distance Di_relative between the vehicle and the object to be identified can be calculated at first according to the driving distance of the vehicle within a period of time, and then the absolute distance Di_absolute between the vehicle and the object to be identified is calculated. A reference is made to the following formula during specific calculation:

Di_absolute=constant+Di_relative, wherein constant is a constant.

For example, when a preset monocular camera photographs the first image of the object to be identified, the relative distance Di_relative is 0, and the constant is L. If the vehicle has run 25 m (which can be obtained via a relation between a vehicle speed and running time) during photographing of the seventh image, the relative distance during the photographing of the seventh image of the object to be identified is −25 m. Thereby, it can be known that the absolute distance Di_absolute between the vehicle and the object to be identified is L−25 m, when any one image among the plurality of images is photographed.

It is worth mentioning that when a solution of obtaining the absolute distance by the relative distance is adopted, data of a single sampling point cannot represent the actual distance between the vehicle and an object to be measured, so that the data cannot be used independently. In a specific implementation process, a plurality of photos need to be collected with the forward moving of the vehicle in the running process of the vehicle, thus extracting a plurality of groups of data. In this way, a change rule of the imaging solid angle along with the distance between the vehicle and the object to be measured can be obtained from the plurality of groups of data, and the quadratic curve used for representing the change rule can be further fitted.

For example, it is set that the solid angle is Y the constant is b, the relative distance is X, the actual distance is Z, and the imaging area is a, so that during the calculation of the solid angle, the formula $Y=a*(b+X)^{-2}$, instead of the formula $Y=a*Z^{-2}$, should be used. Since a real distance between the vehicle and the object to be measured cannot be represented through b+X, a plurality of groups of data are needed during measurement. However, the fitted quadratic curve used for representing the change rule cannot be affected, as long as the plurality of groups of data can represent the change rule of the imaging solid angle along with the distance between the vehicle and the object to be measured.

Further, a vector $\overrightarrow{R_{O'\Delta S}}$ pointing from an origin of coordinates to a surface element $\Delta S$ on the visual surface A1 of the cubic object, and a vector $R_C$ pointing from the origin of coordinates to the imaging surface B1 of the monocular camera can be obtained according to the data and pitch angle information of the monocular camera, and a vector $\overrightarrow{R_{C'\Delta S}}$ from the imaging surface B1 of the monocular camera to the surface element $\Delta S$ is calculated according to the above formula (1). Furthermore, a normal vector $\overrightarrow{n_C}$ of the imaging surface B1 of the monocular camera and a normal vector $\overrightarrow{n_O}$ of the surface element $\Delta S$ can be obtained.

Therefore, a solid angle of each surface element on the visual surface A1 of the cubic object relative to the imaging surface B1 can be calculated through the above formula (2), and all the surface elements on the visual surface are integrated to obtain the imaging solid angle $\Omega_{cubic}$ of the visual surface A1 of the object to be identified relative to the imaging surface B1. It is worth mentioning that since the size of each optical path of an optical device of the monocular camera is very small relative to the size of a whole test scenario, calculation errors caused by imaging parameters of the monocular camera can be ignored.

Figure 4:
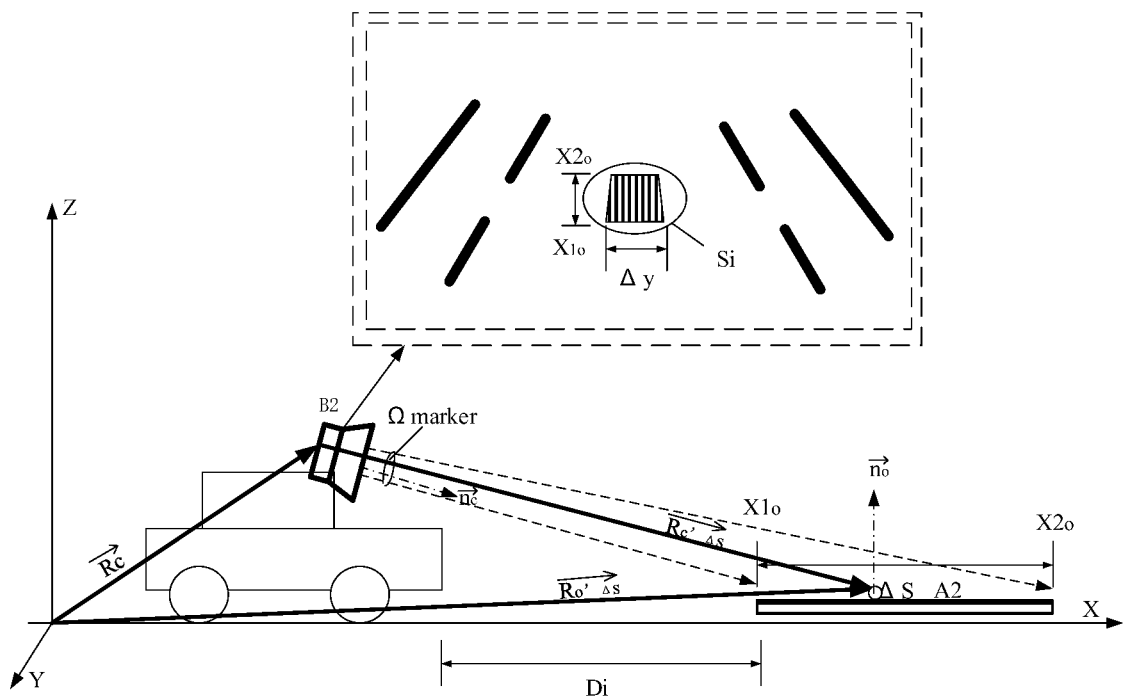
FIG. 4 is a schematic diagram of another implementation scenario illustrated by an exemplary embodiment of the present disclosure.

(2) FIG. 4 is a schematic diagram of a scenario illustrated by an exemplary embodiment of the present disclosure. When the object to be identified is a road surface marker, an imaging solid angle marker of a visual surface A2 of the road surface marker relative to the imaging plane B2 of the monocular camera can be calculated through the following formula:

$$\overrightarrow{R_{c'\Delta s}} = \overrightarrow{R_{o'\Delta s}} - \overrightarrow{R_c} \quad (3)$$

$$\Omega_{marker} = \Delta y \int_{x1_o}^{x2_o} \frac{-\overrightarrow{n_c} \cdot \overrightarrow{n_o}}{|\overrightarrow{R_{c'-s}}|^2} dx \quad (4)$$

The $i^{th}$ image is taken for example. The $i^{th}$ sub-image used for representing the road surface marker is extracted from the $i^{th}$ image. As shown in FIG. 4, the circled strip-type image is the $i^{th}$ sub-image, i.e., an image of the visual surface of the road surface marker on the imaging plane of the monocular camera, which has the area of Si. A three-dimensional stereoscopic model of the road surface marker is built according to the $i^{th}$ sub-image, thus obtaining a width Δy of the road surface marker, X1o of a proximal edge of the road surface marker, which corresponds to the X axis of a scenario coordinate, and X2o of a distal edge of the road surface marker, which corresponds to the X axis of the scenario coordinate.

In addition, a determination method for the relative distance Di between the vehicle and the object to be identified may refer to the above.

Further, a vector $\overrightarrow{R_{O'\Delta S}}$ pointing from an origin of coordinates to a surface element ΔS on the visual surface A2 of the road surface marker, and a vector $\overrightarrow{R_C}$ pointing from the origin of coordinates to the imaging surface B2 of the monocular camera can be obtained according to the data and pitch angle information of the monocular camera, and a vector $\overrightarrow{R_{C'\Delta S}}$ from the imaging surface B2 of the monocular camera to the surface element ΔS is calculated according to the above formula (3). Furthermore, a normal vector $\vec{n}_C$ of the imaging surface B2 of the monocular camera and a normal vector $\vec{n}_O$ of the surface element ΔS can be obtained.

Therefore, a solid angle of each surface element on the visual surface A2 of the road surface marker relative to the imaging surface B2 can be calculated through the above formula (4), and all the surface elements on the visual surface are integrated to obtain the imaging solid angle $\Omega_{marker}$ of the visual surface A2 of the object to be identified relative to the imaging surface B2.

Figure 5:
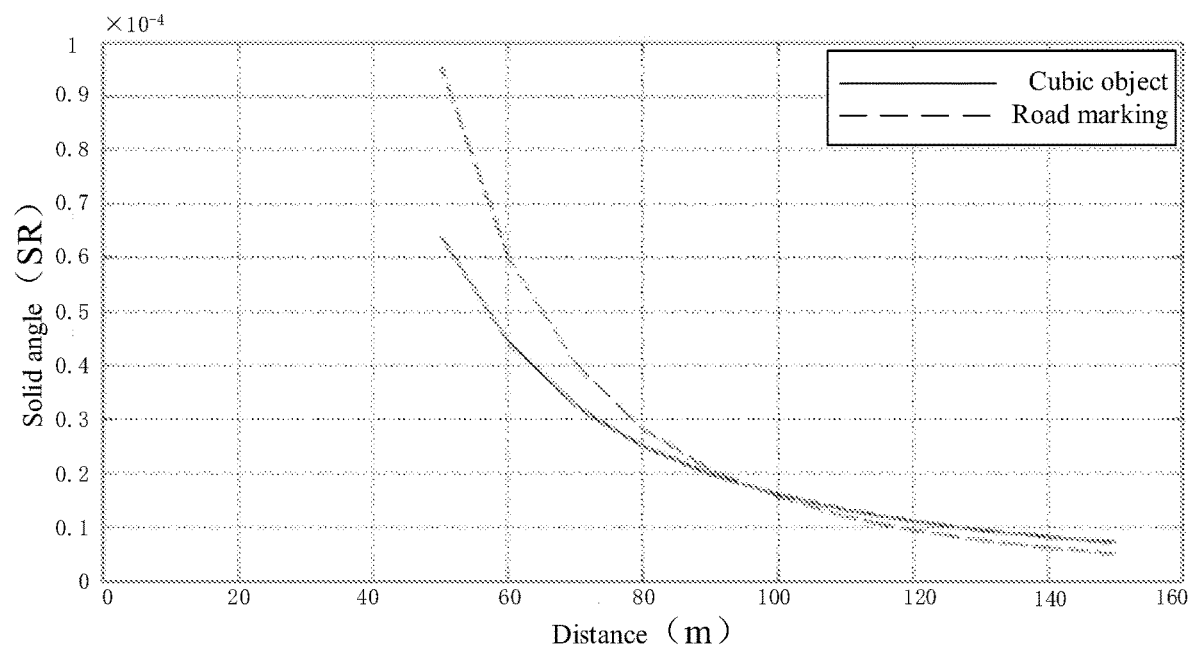
FIG. 5 is a simulation result diagram illustrated by an exemplary embodiment of the present disclosure.

It can be known according to the above analysis that if the object to be identified is the cubic object, the normal vector of the visual surface of the object to be identified faces the vehicle; and if the object to be identified is the road surface marker, the normal vector of the visual surface of the object to be identified is perpendicular to the road and upward. As the vehicle gets closer and closer to the object to be identified, the change rate of the value of "$-\vec{n}_C \cdot \vec{n}_O$" in the formula (4) is greater than the change rate of the value of "$-\vec{n}_C \cdot \vec{n}_O$" in the formula (2). That is, the change rate of the $\Omega_{marker}$ relative to the distance D is greater than the change rate of the $\Omega_{cubic}$ relative to the distance D. Simulation analysis is performed on the measurement results of the cubic object and the road surface marker, respectively, by the parameters in Table 1 and Table 2 to obtain simulation results shown in FIG. 5, thus obtaining that the change rate of the road surface marker is greater than the change rate of the cubic object. For the convenience of observation, the curve in FIG. 5 is a smooth curve drawn according to discrete data after the discrete data are obtained by sampling the plurality of images.

TABLE 1

Parameter table of the cubic object

| Parameters of the cubic object (m) | X axis coordinate of the monocular camera | X axis coordinate of a near point of the cubic object | X axis coordinate of a far point of the cubic object | Distance (range) |
|---|---|---|---|---|
| | 0 | 100.0 | 101.0 | 100.0 |
| | Z axis coordinate of the monocular camera | Z axis coordinate of the lower edge of the visual surface A1 of the cubic object | Z axis coordinate of the higher edge of the visual surface A1 of the cubic object | Width of the visual surface of the cubic object |
| | 1.437 | 0.0 | 0.4 | 0.4 |

TABLE 2

Parameter table of the road surface marker

| Parameters of the road surface marker (m) | X axis coordinate of the monocular camera | X axis coordinate of a near point of the road surface marker | X axis coordinate of a far point of the road surface marker | Distance (range) |
|---|---|---|---|---|
| | 0 | 100.0 | 125.0 | 100.0 |
| | Z axis coordinate of the monocular camera | Z axis coordinate of the lower edge of the visual surface A2 of the road surface marker | Z axis coordinate of the higher edge of the visual surface A2 of the road surface marker | Width of the visual surface of the cubic object |
| | 1.437 | 0.0 | 0.0 | 0.4 |

Figure 6:
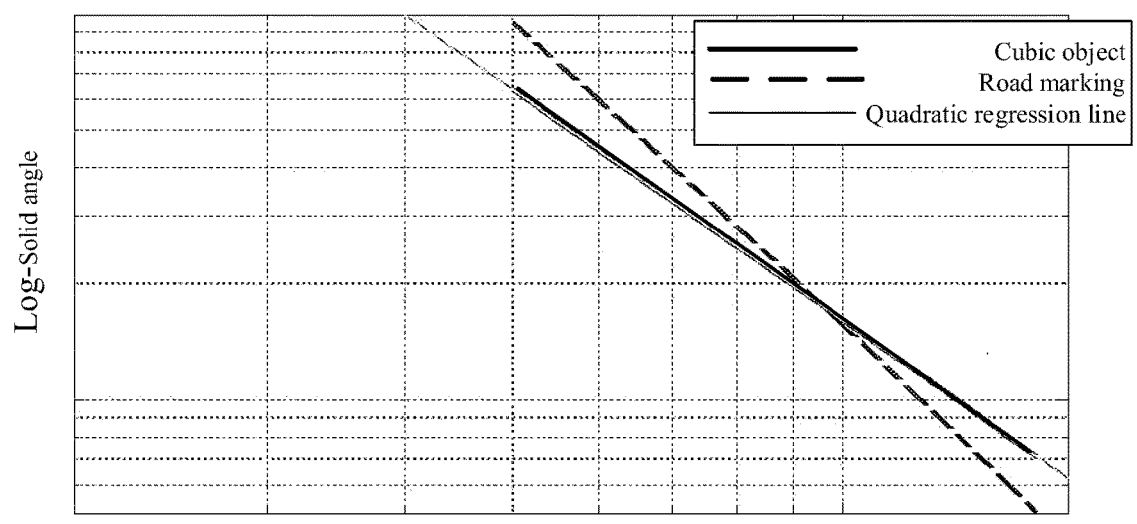
FIG. 6 is another simulation result diagram illustrated by an exemplary embodiment of the present disclosure.

Further, as shown in FIG. 6, the smooth curve corresponding to the cubic object and the smooth curve corresponding to the road surface marker are respectively subjected to logarithmic processing (Log) to obtain a cubic object corresponding line and a road surface marker corresponding line. Then a standard quadratic curve (such as: $y=ax^2+b$) is subjected to the logarithmic processing to obtain a quadratic regression line. It can be known from FIG. 6 that the cubic object corresponding line is more similar to the quadratic regression line, and the road surface marker corresponding line is greatly different from the quadratic regression line.

It can be known from the above that if the object to be identified is the road surface marker, when the change rule of the imaging solid angle $\Omega$ along with the relative distance D is fitted by using a quadratic regression type, the fitted quadratic curve has a relatively large residual standard deviation. On the contrary, if the object to be identified is the cubic object, when the change rule of the imaging solid angle $\Omega$ along with the relative distance D is fitted by using a quadratic regression type, the fitted quadratic curve has a relatively small residual standard deviation. Therefore, a threshold value can be preset. If the residual standard deviation of the fitted quadratic curve is less than the threshold value, the object to be identified is the cubic object, otherwise, the object to be identified is the road surface marker.

Figure 7:
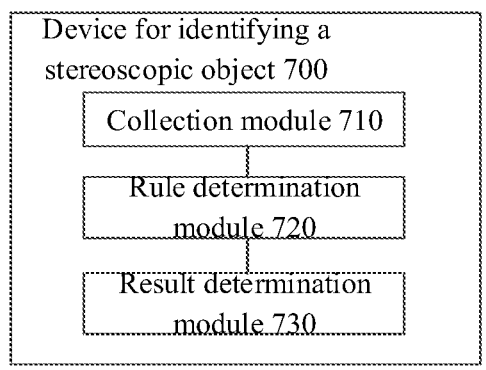
FIG. 7 shows a device for identifying a stereoscopic object illustrated by an exemplary embodiment of the present disclosure.

FIG. 7 shows a device for identifying a stereoscopic object illustrated by an exemplary embodiment of the present disclosure. The device 700 is applied to a vehicle, and the device 700 comprises:

a collection module 710, used for photographing, during the driving process of a vehicle, an object to be identified by means of a monocular camera on the vehicle, so as to obtain a plurality of images;

a rule determination module 720, used for determining, according to the plurality of images, an imaging change rule of the object to be identified that is projected onto an imaging plane of the monocular camera, wherein the imaging changes along with a change in the distance between the object to be identified and the vehicle; and a result determination module 730, used for determining that the object to be identified is a stereoscopic object if the imaging change rule matches a quadratic curve.

During the driving process of the vehicle, the object to be identified is photographed by the monocular camera on the vehicle, and the imaging change rule of the object to be identified that is projected onto the imaging plane of the monocular camera is determined according to the plurality of obtained images. If the imaging change rule matches the quadratic curve, it is determined that the object to be identified is a stereoscopic object. In this way, the problem that the monocular camera cannot determine whether the object to be identified is a stereoscopic object is solved, and the identification precision of an ADAS for the object to be identified on a lane is improved.

Further, the number of the plurality of images is N, and N is an integer greater than 3. The rule determination module 720 is used for setting i to be from 1 to N in sequence, and performing the following steps on the $i^{th}$ image among the plurality of images:

extracting the $i^{th}$ sub-image used for representing the object to be identified from the $i^{th}$ image;

determining the area Si of the object to be identified that is projected onto the imaging plane of the monocular camera according to the $i^{th}$ sub-image;

determining the distance Di between the object to be identified and the vehicle when the $i^{th}$ image is obtained by means of the monocular camera; and fitting a quadratic curve used for representing a change rule of the imaging area S along with the distance D between the object to be identified and the vehicle by using a quadratic regression type according to Si and Di corresponding to each of the plurality of images.

Further, the number of the plurality of images is N, and N is an integer greater than 3. The rule determination module 720 is used for setting i to be from 1 to N in sequence, and performing the following steps on the $i^{th}$ image among the plurality of images:

setting i to be from 1 to N in sequence, and performing the following steps on the $i^{th}$ image among the plurality of images;

extracting the $i^{th}$ sub-image used for representing the object to be identified from the $i^{th}$ image;

determining a solid angle $\Omega i$ corresponding to the object to be identified according to the $i^{th}$ sub-image;

determining the distance Di between the object to be identified and the vehicle when the $i^{th}$ image is obtained by means of the monocular camera; and fitting a quadratic curve used for representing a change rule of an imaging solid angle $\Omega$ along with the distance D between the object to be identified and the vehicle by using a quadratic regression type according to $\Omega i$ and Di corresponding to each of the plurality of images.

Further, the rule determination module 720 is used for:

initializing the distance between the object to be identified and the vehicle to be Dconstant before the first image is obtained by means of the monocular camera;

determining the driving distance Dix of the vehicle when the $i^{th}$ image is obtained by means of the monocular camera; and determining the distance Di between the object to be identified and the vehicle according to Dconstant and Dix.

Further, the result determination module 730 comprises:

a residual standard deviation determination sub-module, used for determining a residual standard deviation of the fitted quadratic curve; and an identification sub-module, used for determining that the object to be identified is a stereoscopic object when the residual standard deviation is within a preset value range.

Further, the identification sub-module is further used for:

determining that the object to be identified is a road surface marker when the residual standard deviation is outside the preset value range.

Other implementation details and effects of the device 700 for identifying the stereoscopic object may refer to the embodiment of the abovementioned method for identifying the stereoscopic object, so descriptions thereof will not be repeated here.

The present disclosure further provides a computer readable storage medium storing a computer program. The program, when executed by a processor, implements the steps of the method for identifying the stereoscopic object.

The present disclosure further provides a device for identifying a stereoscopic object, comprising: the computer readable storage medium; and one or more processors, used for executing the program stored in the computer readable storage medium.

The present disclosure further provides a vehicle. The vehicle includes the device for identifying the stereoscopic object. The device for identifying the stereoscopic object, included in the vehicle, can be the device 700 as shown in FIG. 7, and can also be a device composed of the computer readable storage medium and the processor.

The preferable embodiments of the present disclosure are described above in detail in conjunction with the accompanying drawings. However, the present disclosure is not limited to the specific details in the foregoing embodiments. Various simple variations can be made to the technical solutions of the present disclosure within the technical concept ranges of the present disclosure, and these simple variations all fall within the protection scope of the present disclosure. For example, a plurality of monocular cameras are used to simultaneously acquire the images, or a binocular or multi-ocular camera is used to simultaneously acquire the images, so as to enhance an image processing result.

Those skilled in the art can understand that all or part of the steps in the methods of the above embodiments can be completed by a program that instructs related hardware. This program is stored in a computer readable storage medium and includes a plurality of instructions configured to cause a single-chip microcomputer, chip or processor to execute all or part of the steps of the methods described in the various embodiments of this application. The computer storage media include, but not limited to, various media that can store program codes, such as a Phase-change Random Access Memory (PRAM), a Static Random Access Memory (SRAM), a Dynamic Random Access Memory (DRAM), other types of RAMs, a Read Only memory (ROM), an Electrically Erasable Programmable Read-Only Memory (EEPROM), a flash memory or other internal memory technologies, a CD-ROM, a Digital Video Disk (DVD) or other optical memories, a magnetic cartridge type magnetic tape, a magnetic tape/disk storage device or other magnetic storage devices. In addition, it should be noted that all the specific technical features described in the foregoing specific embodiments can be combined in any suitable manner without conflicts. In order to avoid unnecessary repetitions, various possible combinations are not described separately in the present disclosure.

In addition, various different embodiments of the present disclosure can also be arbitrarily combined, and these combinations should also be regarded as the content disclosed in the present disclosure, as long as they do not violate the idea of the present disclosure.

The invention claimed is:

1. A method for identifying a stereoscopic object, wherein the method is applied to a vehicle, and the method comprises:
    photographing, during the driving process of a vehicle, an object to be identified by means of a monocular camera on the vehicle, so as to obtain a plurality of images;
    determining, according to the plurality of images, an imaging change rule of the object to be identified that is projected onto an imaging plane of the monocular camera, wherein the imaging changes along with a change in the distance between the object to be identified and the vehicle; and
    determining that the object to be identified is a stereoscopic object if the imaging change rule matches a quadratic curve.

2. The method according to claim 1, wherein the number of the plurality of images is N, and N is an integer greater than 3; and the step of determining, according to the plurality of images, an imaging change rule of the object to be identified that is projected onto the imaging plane of the monocular camera comprises:
    setting i to be from 1 to N in sequence, and performing the following steps on the $i^{th}$ image among the plurality of images:
    extracting the $i^{th}$ sub-image used for representing the object to be identified from the $i^{th}$ image;
    determining the area Si of the object to be identified that is projected onto the imaging plane of the monocular camera according to the $i^{th}$ sub-image;
    determining the distance Di between the object to be identified and the vehicle when the $i^{th}$ image is obtained by means of the monocular camera; and
    fitting a quadratic curve used for representing a change rule of the imaging area S along with the distance D between the object to be identified and the vehicle by using a quadratic regression type according to Si and Di corresponding to each of the plurality of images.

3. The method according to claim 1, wherein the number of the plurality of images is N, and N is an integer greater than 3; and the step of determining, according to the plurality of images, an imaging change rule of the object to be identified that is projected onto the imaging plane of the monocular camera comprises:
    setting i to be from 1 to N in sequence, and performing the following steps on the $i^{th}$ image among the plurality of images:
    extracting the $i^{th}$ sub-image used for representing the object to be identified from the $i^{th}$ image;
    determining a solid angle $\Omega i$ corresponding to the object to be identified according to the $i^{th}$ sub-image;
    determining the distance Di between the object to be identified and the vehicle when the $i^{th}$ image is obtained by means of the monocular camera; and
    fitting a quadratic curve used for representing a change rule of an imaging solid angle $\Omega$ along with the distance D between the object to be identified and the vehicle by using a quadratic regression type according to $\Omega i$ and Di corresponding to each of the plurality of images.

4. The method according to claim 2, wherein the step of determining the distance Di between the object to be identified and the vehicle when the $i^{th}$ image is obtained by means of the monocular camera comprises:
    initializing the distance between the object to be identified and the vehicle to be Dconstant before the first image is obtained by means of the monocular camera;
    determining the driving distance Dix of the vehicle when the $i^{th}$ image is obtained by means of the monocular camera; and
    determining the distance Di between the object to be identified and the vehicle according to Dconstant and Dix.

5. The method according to claim 2, wherein the step of determining that the object to be identified is a stereoscopic object if the imaging change rule matches the quadratic curve comprises:
    determining a residual standard deviation of the fitted quadratic curve; and
    determining that the object to be identified is a stereoscopic object if the residual standard deviation is within a preset value range.

6. The method according to claim 5, wherein the method further comprises:
    determining that the object to be identified is a road marking if the residual standard deviation is outside the preset value range.

7. A device for identifying a stereoscopic object, wherein the device is applied to a vehicle, and the device comprises:

a collection module, used for photographing, during the driving process of a vehicle, an object to be identified by means of a monocular camera on the vehicle, so as to obtain a plurality of images;

a rule determination module, used for determining, according to the plurality of images, an imaging change rule of the object to be identified that is projected onto an imaging plane of the monocular camera, wherein the imaging changes along with a change in the distance between the object to be identified and the vehicle; and a result determination module, used for determining that the object to be identified is a stereoscopic object if the imaging change rule matches a quadratic curve.

8. The device according to claim 7, wherein the number of the plurality of images is N, and N is an integer greater than 3; and the rule determination module is used for setting i to be from 1 to N in sequence, and performing the following steps on an $i^{th}$ image among the plurality of images:

extracting the $i^{th}$ sub-image used for representing the object to be identified from the $i^{th}$ image;

determining the area Si of the object to be identified that is projected onto the imaging plane of the monocular camera according to the $i^{th}$ sub-image;

determining the distance Di between the object to be identified and the vehicle when the $i^{th}$ image is obtained by means of the monocular camera; and fitting a quadratic curve used for representing a change rule of the imaging area S along with the distance D between the object to be identified and the vehicle by using a quadratic regression type according to Si and Di corresponding to each of the plurality of images.

9. The device according to claim 7, wherein the number of the plurality of images is N, and N is an integer greater than 3; and the rule determination module is used for setting i to be from 1 to N in sequence, and performing the following steps on the $i^{th}$ image among the plurality of images:

setting i to be from 1 to N in sequence, and performing the following steps on the $i^{th}$ image among the plurality of images:

extracting the $i^{th}$ sub-image used for representing the object to be identified from the $i^{th}$ image;

determining a solid angle Ωi corresponding to the object to be identified according to the $i^{th}$ sub-image;

determining the distance Di between the object to be identified and the vehicle when the $i^{th}$ image is obtained by means of the monocular camera; and fitting a quadratic curve used for representing a change rule of an imaging solid angle Ω along with the distance D between the object to be identified and the vehicle by using a quadratic regression type according to Ωi and Di corresponding to each of the plurality of images.

10. The device according to claim 8, wherein the rule determination module is used for:

initializing the distance between the object to be identified and the vehicle to be Dconstant before the first image is obtained by means of the monocular camera;

determining the driving distance Dix of the vehicle when the $i^{th}$ image is obtained by means of the monocular camera; and determining the distance Di between the object to be identified and the vehicle according to Dconstant and Dix.

11. The device according to claim 8, wherein the result determination module comprises:

a residual standard deviation determination sub-module, used for determining a residual standard deviation of the fitted quadratic curve; and an identification sub-module, used for determining that the object to be identified is a stereoscopic object if the residual standard deviation is within a preset value range.

12. The device according to claim 11, wherein the identification sub-module is further used for:

determining that the object to be identified is a road marking if the residual standard deviation is outside the preset value range.

13. A non-transitory computer readable storage medium, storing a computer program, wherein the program, when executed by a processor, implements the steps of the method according to claim 1.

* * * * *